US006507331B1

(12) United States Patent
Schlangen et al.

(10) Patent No.: US 6,507,331 B1
(45) Date of Patent: Jan. 14, 2003

(54) DISPLAY DEVICE

(75) Inventors: Lucas J. M. Schlangen, Eindhoven (NL); Karel E. Kuijk, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/577,548

(22) Filed: May 24, 2000

(30) Foreign Application Priority Data

May 27, 1999 (EP) ............................................ 99201690

(51) Int. Cl.[7] ............................ G09G 3/36; G02F 1/133

(52) U.S. Cl. ........................... 345/100; 345/95; 345/97; 345/99

(58) Field of Search ............................ 345/100, 97, 94, 345/95, 99

(56) References Cited

U.S. PATENT DOCUMENTS

| | | | | | |
|---|---|---|---|---|---|
| 3,909,114 | A | * | 9/1975 | Haas et al. | 349/202 |
| 4,380,372 | A | * | 4/1983 | Taguchi | 349/188 |
| 4,529,271 | A | * | 7/1985 | Berreman et al. | 349/34 |
| 5,251,048 | A | * | 10/1993 | Doane et al. | 345/87 |
| 5,384,067 | A | * | 1/1995 | Doane et al. | 349/183 |
| 5,420,604 | A | * | 5/1995 | Scheffer et al. | 345/100 |
| 5,437,811 | A | * | 8/1995 | Doane et al. | 252/299.01 |
| 5,699,074 | A | * | 12/1997 | Sutherland et al. | 345/90 |
| 5,748,277 | A | * | 5/1998 | Huang et al. | 349/169 |
| 6,169,530 | B1 | * | 1/2001 | Mori et al. | 345/93 |
| 6,181,310 | B1 | * | 1/2001 | Nomura | 345/97 |
| 6,313,817 | B2 | * | 11/2001 | Kuijk | 345/87 |

FOREIGN PATENT DOCUMENTS

EP 0863427 A1 * 9/1998 ........... G02F/1/133

OTHER PUBLICATIONS

Richard C. Dorf, ed., The Electrical Engineering Handbook, CRC Press, Inc. 1993, p. 2485.*

Richard C. Dorf, ed., The Engineering Handbook, CRC Press, Inc. 1996, pp. 1343–1346.*

"Active Addressing Method for High–Contrast Video–Rate STN Displays", by T.J. Sscheffe et al, SID 92 Digest, pp. 228–231.

"Dynamic Drive for Bistable Cholesteric Displays: A Rapid Addressing Scheme", by Huang et al, SED 95 Digest, pp. 347–350.

"A New Addressing Technique for Fast Responding STN LCDs" by Ruckmongathan et al, Japan Display 97, pp. 65–68.

* cited by examiner

*Primary Examiner*—Dennis-Doon Chow
*Assistant Examiner*—Leland R. Jorgensen

(57) ABSTRACT

A display device having a first substrate with row electrodes and a second substrate with column electrodes define pixels of a light-modulating cell. An electro-optical layer is capable of assuming a plurality of states with at least two states of which are stable in the absence of an electric field. The display device further has drive means for driving the row electrodes with selection signals and for driving the column electrodes with data signals in conformity with an image to be displayed. The first and second substrates are spaced such that the light-modulating cell has a thickness at least two times the pitch P of the electro-optical material. In the operating state, the drive means sequentially provide groups of p row electrodes (p>1) with mutually orthogonal signals during a selection period.

15 Claims, 4 Drawing Sheets

DISPLAY DEVICE

BACKGROUND OF THE INVENTION

The invention relates to a display device comprising a first substrate provided with row electrodes and a second substrate provided with column electrodes, in which overlapping parts of row and column electrodes with an interpositioned layer of electro-optical material define pixels, said electro-optical layer comprising a chiral-nematic liquid crystal material which is capable of assuming a plurality of states, of which at least a focal-conic state and a planar state are stable in the absence of an electric field, further comprising drive means for driving the row electrodes with selection signals and for driving the column electrodes with data signals in conformity with an image to be displayed.

More in general, the invention relates to a display device in which an electro-optical layer is switchable between a plurality of (long-lasting) stable states. A display device based on two (or more) stable states may be used in various applications, for example, when information written once should be maintained for a longer period of time (electronic newspapers, telephony, smart cards, electronic price tags, personal digital assistants, billboards, etc.).

A pixel in such a display device, based on chiral-nematic liquid crystal material has a plurality of stable states, namely a light-transmissive state, which corresponds to the focal-conic state of a layer of liquid crystal material, and a reflecting state which corresponds to the planar state of the layer of liquid crystal material. The color (wavelength) of the reflected light is dependent on the pitch of the liquid crystal material, i.e. the distance through which the director (the average orientation of the molecules in a layer) makes a twist of 360 degrees. In the absence of an electric field, both states are stable for a long period of time. In the light-transmissive states, light of said color is passed to a larger or smaller degree, dependent on the texture (ratio between parts of a pixel in the planar and the focal-conic states, respectively). Moreover, such a display device may also have the so-called homeotropic state; at a high voltage, all molecules (directors) direct themselves to the fields. Incident light then passes through the liquid crystal material in an unhindered way. When used without polarizers, the color in the homeotropic state of a reflective display device is determined by the background color, for example, an absorbing layer. The display device is usually only brought to this state to reach one of the two stable states. Dependent on the frequency used and on the voltage of the switching pulses, a pixel changes to the focal-conic or the planar state.

The selection time (addressing time) for writing the different states is usually rather long. Without special measures, it is 20 to 30 msec, which is too long for use in, for example, an electronic newspaper.

The article "Dynamic Drive for Bistable Cholesteric Displays; A Rapid Addressing Scheme", SID 95 Digest, page 347 describes how the addressing time which is necessary for reaching the different states can be reduced by means of a special drive mode, using a preparation phase and an evolution phase.

BRIEF SUMMARY OF THE INVENTION

It is, inter alia, an object of the present invention to reduce the selection period. To this end, a display device according to the invention is characterized in that, in the operating state, the drive means sequentially provide groups of p row electrodes (p>1) with mutually orthogonal signals during a selection period.

The use of orthogonal signals is known per se for driving (super)twisted nematic display devices so as to inhibit a phenomenon which is known as frame response. In contrast to the conventional single line addressing, a number of rows is selected simultaneously. This requires a special treatment of incoming signals which must be processed mathematically so as to determine the correct signals for the column electrodes. Said phenomenon of frame response occurs when the frame time becomes too long in proportion to the response time of the liquid crystal material. The transmission of a pixel is then no longer determined by the effective voltage value in a plurality of successive selections, but follows the presented voltage pattern to a greater or lesser degree. In the case of orthogonal drive, the drive signals are adapted in such a way that a pixel is driven several times per frame period. The transmission is then again determined by said effective voltage value in a plurality of successive selections. Notably when used in the above-mentioned applications (electronic newspapers, telephony, smart cards and electronic price tags) of chiral-nematic liquid crystal material, in which the drive voltage is removed after information has been written once, such a problem does not occur in the absence of successive selections.

The invention is based on the recognition that the selection period should be sufficiently long, on the one hand, so that the liquid crystal (the pixel) reacts to the effective voltage value of the presented signals, whereas, on the other hand, a plurality of rows (p) can be simultaneously driven with orthogonal signals within the selection period, while a column signal is determined by the desired state of the pixels and the corresponding orthogonal signals on the rows. In the simultaneously driven rows, sufficient energy is presented to cause the pixels to switch. Consequently, the display device is written faster by a factor of p. The p rows may be spread on the surface of the display device but preferably form a group of consecutive rows. The optimum value for p appears to be dependent on the electro-optical characteristic of the pixels, such that $$p_{opt} = 16.V_{pf}^2\left[\frac{\frac{1}{2}(V_{on}^2 + V_{off}^2) - V_{pf}^2}{(V_{on}^2 - V_{off}^2)^2}\right],$$

in which $V_{on}$ is the voltage across a pixel in the reflection (transmission)/voltage characteristic curve required for the transition to a planar state via the homeotropic state, $V_{off}$ is the voltage across a pixel in the reflection (transmission)/voltage characteristic curve for the transition to the focal-conic state, and $V_{pf}$ is the voltage across a pixel in the reflection (transmission)/voltage characteristic curve for the transition from the planar state to the focal-conic state.

In principle, $V_{pf}$, $V_{on}$ and $V_{off}$ are related to reaching a certain reflection (transmission), for example 99%, 99% and 1% of the maximum reflection (or, for example 95%, 95% and 5%). In practice, notably $V_{on}$ and $V_{off}$ are often also determined by the adjustment of the drive circuit (driver IC).

Moreover, the reflection (transmission)/voltage characteristic also depends on the history. In some cases, the state reached after selection depends on the initial situation and may be different for an initial situation in which the pixel at a voltage of 0 volt is in the focal-conic state, as compared with an initial situation in which the pixel at a voltage of 0 volt is in the planar state. This is not a problem for on-off switching (for example, alphanumerical) displays but is a problem in the case of fast changes in the image in which grey scales are also to be displayed. To provide this facility, a preferred embodiment of a display device according to the invention is characterized in that the drive means comprise means for bringing, prior to a selection period, the liquid crystal material in groups of p rows of pixels to an (unambiguously) defined state in the operating state. This defined state is preferably the homeotropic state, but the focal-conic state is alternatively possible, while even a state associated with a given texture (grey value) is feasible.

For the orthogonal functions, for example, Walsh functions are chosen, but other functions are alternatively possible such as, for example, Haar functions, Rademacher functions or Slant functions. To prevent a DC voltage from being built up when driving the same kind of information for a long period of time (for example, a title of a document at the top of a page whose contents change, or the word "page" at the bottom of a page of an electronic newspaper), the voltage integral of the selection voltages in a selection period is preferably zero.

These and other aspects of the invention are apparent from and will be elucidated with reference to the embodiments described hereinafter.

BRIEF DESCRIPTION OF THE SEVERAL VIEWS OF THE DRAWING

In the drawings:

FIG. 3 shows the dynamical behavior of a pixel, while

The drawings are not to scale and are shown diagrammatically.

DETAILED DESCRIPTION OF THE INVENTION

Figure 1:
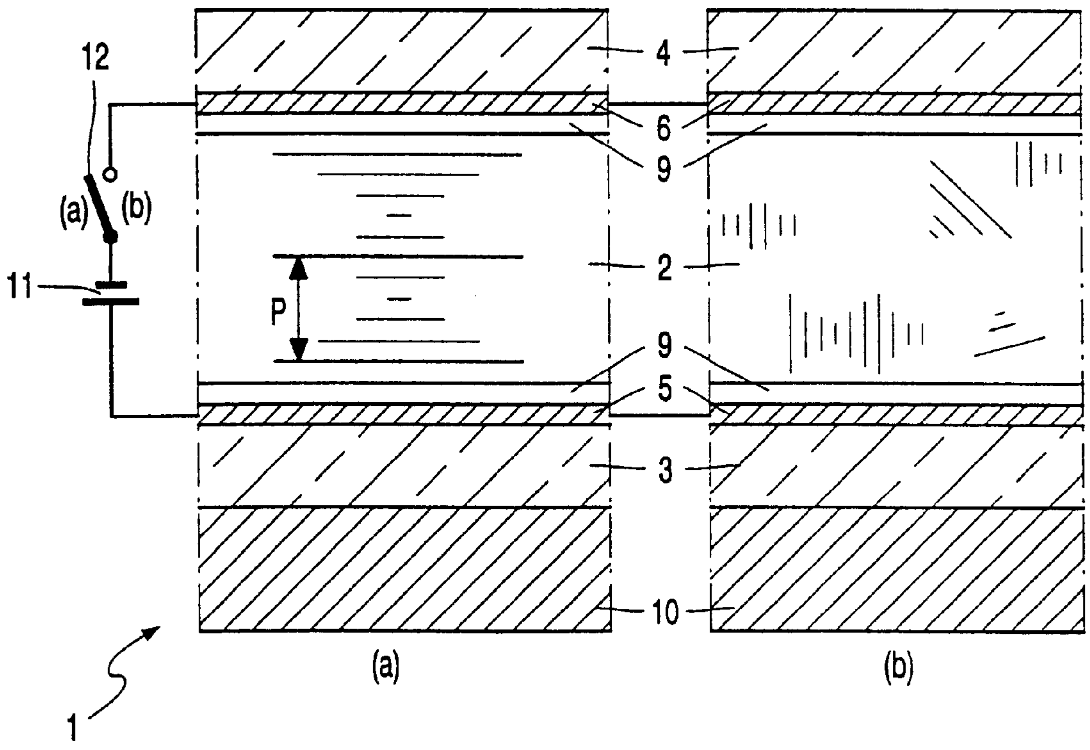
FIG. 1 is a diagrammatic cross-section of a light-modulating cell according to the invention, in two different states.

FIG. 1 is a diagrammatic cross-section of a part of a light-modulating cell 1 with a chiral-nematic liquid crystal material 2 which is present between two substrates 3, 4 of, for example, glass, provided with electrodes 5, 6. If necessary, the device comprises orientation layers 9 which orient the liquid crystal material on the inner walls of the substrates. In this case, the liquid crystal material has a positive optical anisotropy and a positive dielectric anisotropy. In the example of FIG. 1, the light-modulating cell has an absorbing layer 10.

The chiral-nematic liquid crystal material 2 is a mixture of a nematic liquid crystal material with a positive dielectric anisotropy and chiral material which is present in such a quantity that a chiral-nematic structure results with a certain pitch P; this pitch P is the distance through which the director of the liquid crystal material makes a twist of 360 degrees. The liquid crystal molecules are oriented more or less perpendicularly (or in some cases parallel) to a wall of the substrate. A first stable state (the planar state) now consists of a helix structure with pitch P (FIG. 1$^{a}$). The thickness d of the light-modulating cell is several times the pitch P (for example, 6 times, but at least 2 times).

The planar state has the property that it reflects light at a wavelength in a range around $\lambda$=n.P (n: average refractive index). In the device of FIG. 1, such a liquid is chosen that the planar structure has such a pitch that it reflects, for example, blue light, while a black absorbing background 10 is chosen. Blue characters are then generated against a black background (or the other way around) with the display device shown.

Another stable state which such a chiral-nematic liquid crystal material may assume is the focal-conic state (FIG. 1$^{b}$), which is produced after the electrodes 5, 6 are energized with one or more electric voltage pulses of a given value (shown by means of a voltage source 11 and a switch 12 in FIG. 1). The helix structure is broken up, as it were, into pieces which are arbitrarily oriented and in which incident light is no longer (partly) reflected but may reach the absorbing background.

At a high voltage across the light-modulating cell, the liquid crystal material assumes a third state referred to as the homeotropic state, i.e. all molecules direct themselves towards the field and the light-modulating cell is transparent at all (visible) wavelengths. Dependent on the drive voltage (period of time and amplitude of the signals), the light-modulating cell switches from this state to the planar or the focal-conic state.

Figure 2:
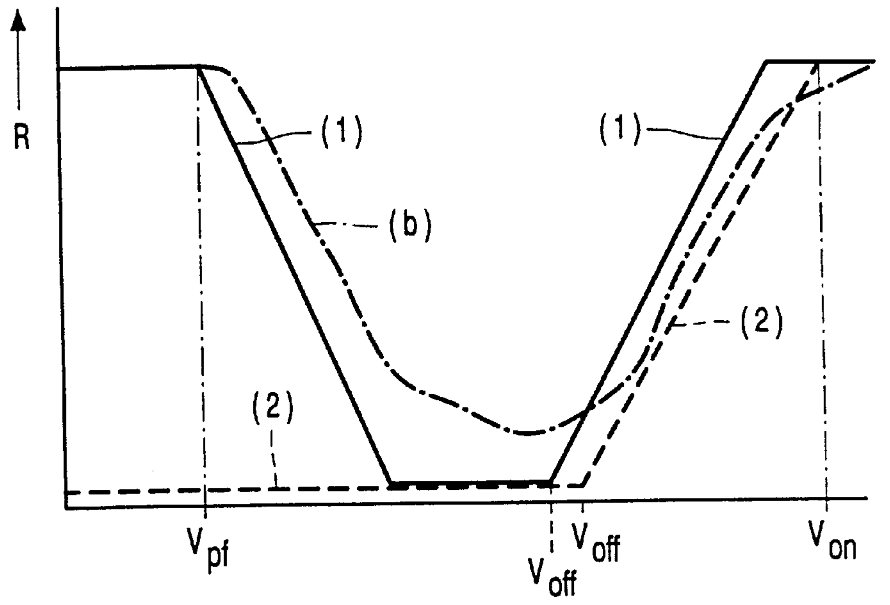
FIG. 2 shows diagrammatically the reflection voltage characteristic curve for the display device of FIG. 1.

FIG. 2 shows diagrammatically the reflection voltage characteristic curve for the pixel of FIG. 1. The state at zero voltage is dependent on the history. By way of illustration, the chiral-nematic state is chosen so that the pixel reflects blue light at a high reflection value R. For a pulse having an effective value of the (threshold) voltage $V_{pf}$, the liquid changes to the focal-conic state (curve 1) in which R is substantially zero (the background is visible). When the effective voltage of the pulse is further increased, the reflection again increases from $V_{off}$ to a high value. If the liquid is in the focal-conic state at 0 volt, the increase of the reflection starts at a slightly higher effective voltage $V'_{off}$ (curve 2) and reaches the high reflection at $V_{on}$. In the transition area $V_{off}$–$V_{on}$, intermediate reflection levels are possible which are, however, not unambiguously defined; this is, however, no drawback for alphanumerical applications. By, as it were, erasing the display device (or a part thereof) prior to each selection (writing information), for example, (by means of one or more pulses) via the homeotropic state, it is achieved that the curves (1), (2) coincide so that $V_{off}$ and $V_{on}$ are determined unambiguously. $V_{off}$ and $V_{on}$ are determined in this case by the reflection voltage characteristic (for example, 1% and 99% of the maximum reflection) but, if necessary, may be defined differently (for example, 5% and 95% of the maximum reflection). The display device (or a part thereof) may be alternatively erased via the focal-conic state (or another unambiguously determined state, for example a grey value such as midgrey).

Figure 3:
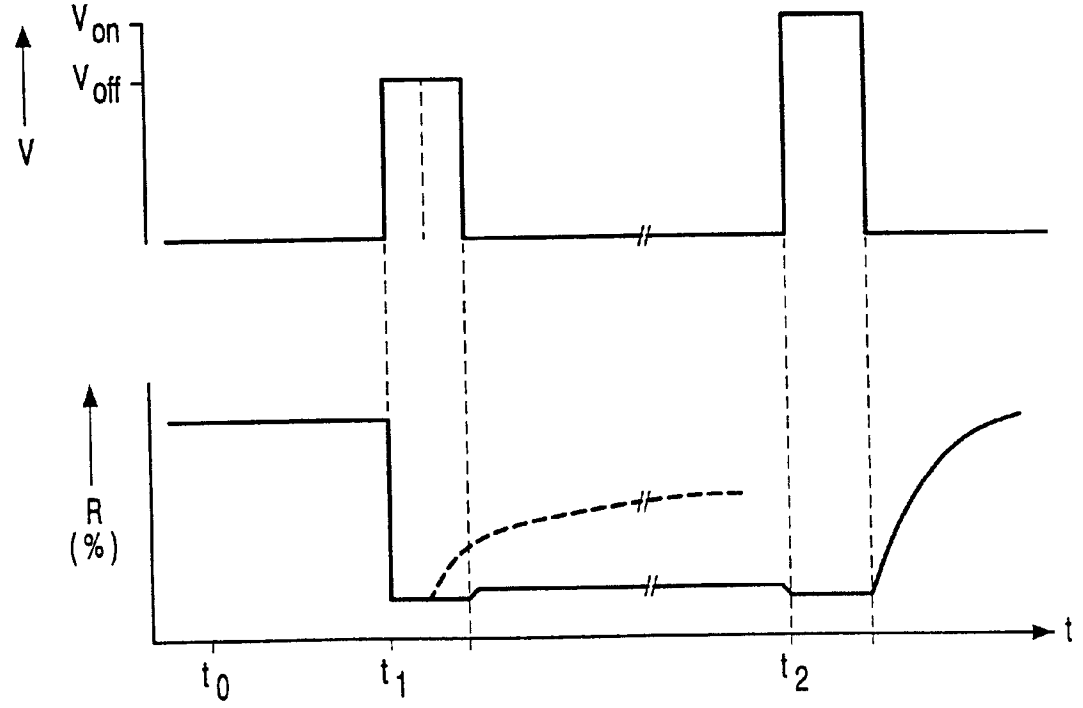

FIG. 3 shows the dynamical behavior of a pixel which is in the planar state at instant $t_0$, changes to the focal-conic state at instant $t_1$ and is switched to the homeotropic state at instant $t_2$ (mainly by the choice of the amplitude of the switching pulses). This state relaxes to the planar state after the pulse(s). It appears that, notably for the change from the planar state to the focal-conic state, the pulse width of the signal used must have a given minimum value. At a too short pulse duration, the pixel relaxes again to the planar state (broken-line curve in FIG. 3). For a satisfactory operation, the duration of the switching signal (preferably presented as an alternating voltage) should be at least 20 msec. For larger image formats (electronic newspapers) and also for certain applications in which writing must be done fast and in large amounts (for example, moving images, preparing electronic labels), this is too long.

Figure 4:
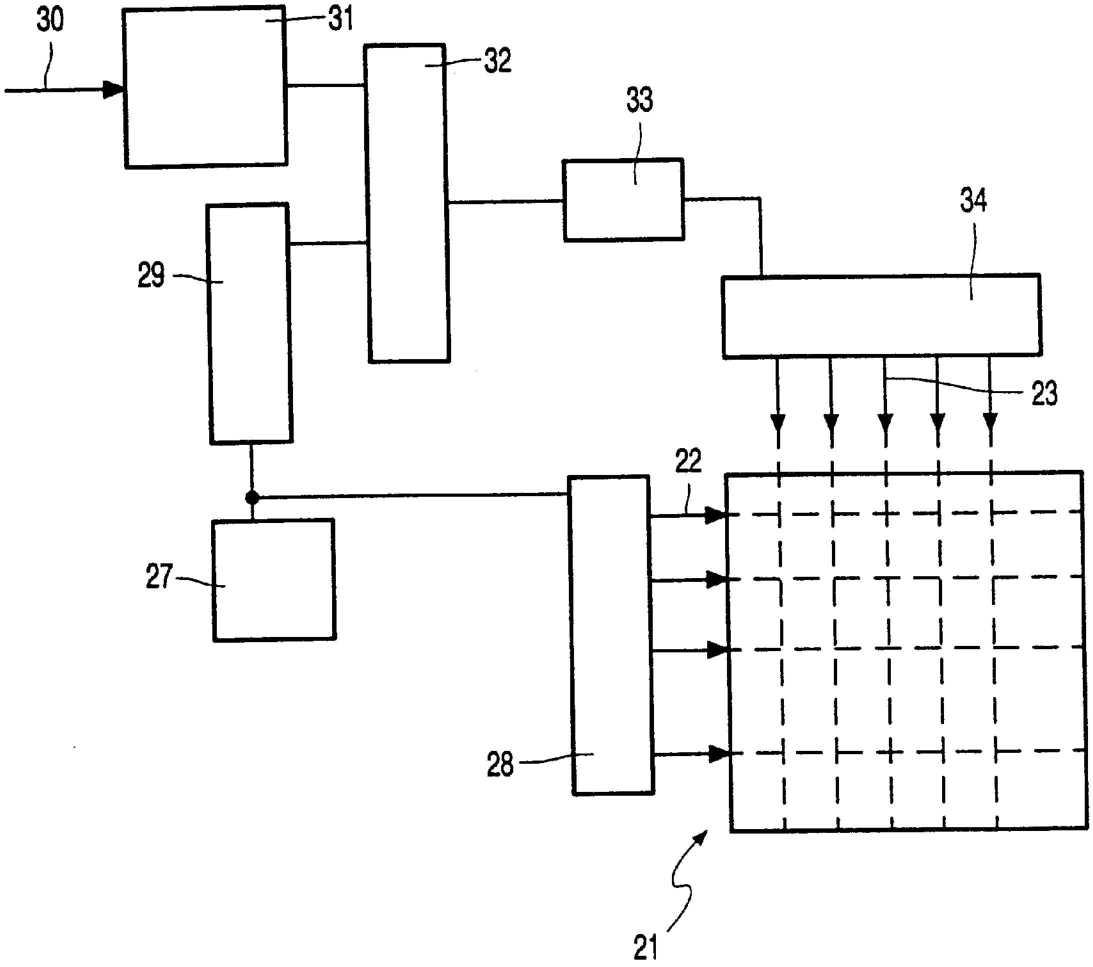
FIG. 4 shows a practical embodiment of a display device with a matrix of pixels.

According to the invention, p rows are driven simultaneously during the selection period $t_{sel}$ by means of orthogonal selection signals. FIG. 4 shows a practical embodiment of a display device with a matrix 21 of pixels at the area of crossings of N rows 22 and M columns 23. The device further comprises a row function generator 27, for example, a ROM, for generating orthogonal signals $F_i(t)$ for driving the rows 22. During a so-called elementary time interval, row vectors are defined which drive a group of p rows via a drive circuit 28. The row vectors are also written in a row function register 29. For a more extensive description of this drive mode, reference is made to articles by T. J. Scheffer and B. Clifton "Active Addressing Method for High Contrast Video-Rate STN Displays", SfD Digest 92, pp. 228–231 and by T. N. Ruckmongathan et al "A New Addressing Technique for Fast Responding STN LCDs", Japan Display 92, pp. 65–68.

Information 30 to be displayed is stored in a N×M buffer memory 31 and read as so-called information vectors per elementary unit of time. Signals for the columns 23 are obtained by multiplying, during each elementary unit of time, the then valid values of the row vector and the information vector (column vector) and by subsequently adding the p obtained products. The multiplication of the row and column vectors valid during an elementary unit of time is effected by comparing them in an array 32 of M exclusive ORs. The addition of the products is effected by applying the outputs of the array of exclusive ORs to the summation logic 33. The signals coming from the summation logic 33 control a column drive circuit 34 which provides the columns 23 with voltages $G_j(t)$ with (p+1) possible voltage levels.

Figure 5:
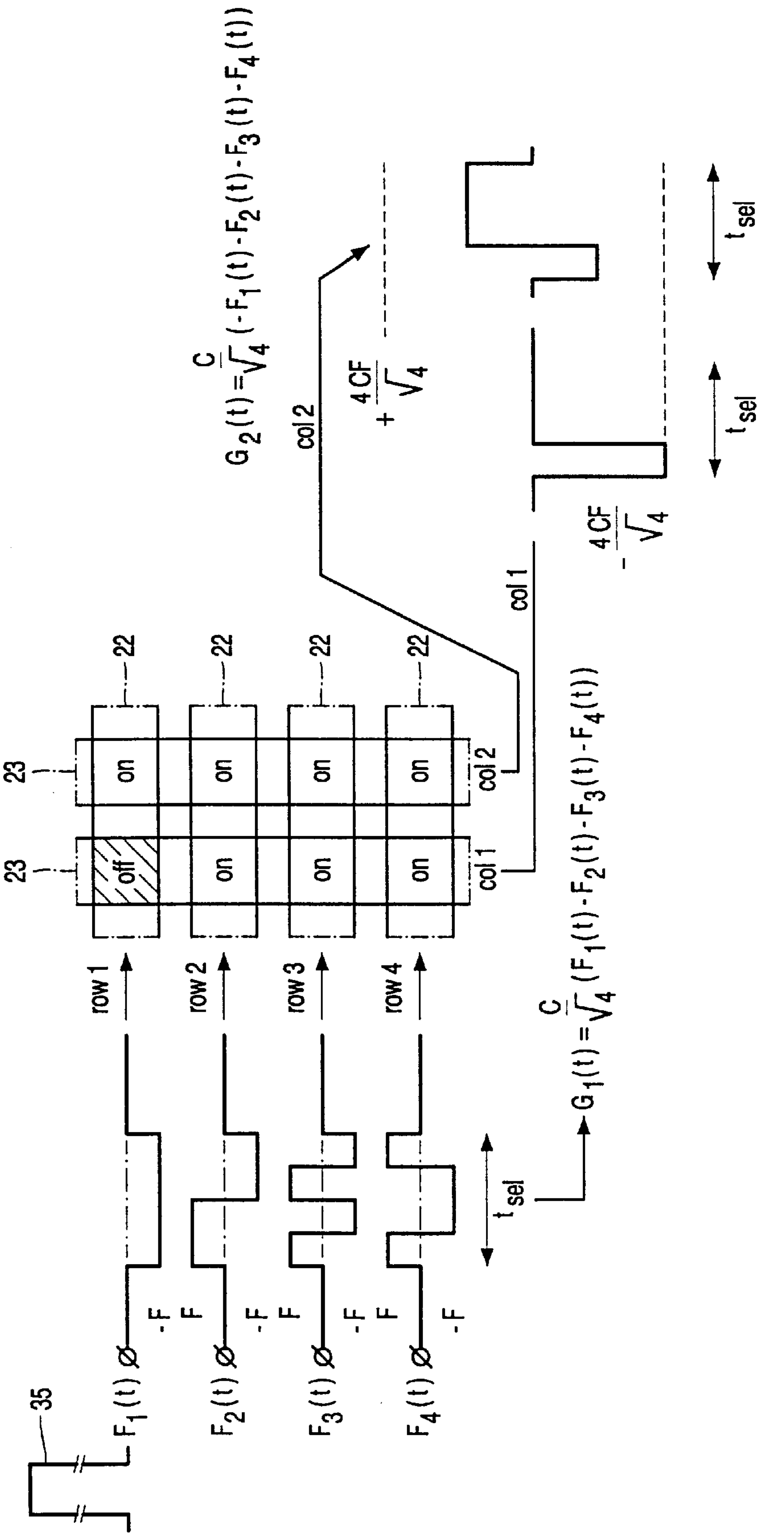
FIG. 5 shows the variation of the row and column signals for a simplified matrix.

This is shown in FIG. 5 for driving four rows at a time. Four orthogonal selection signals $F_1(t)$, $F_2(t)$, $F_3(t)$, $F_4(t)$ are presented to the rows during $t_{sel}$. To obtain the information shown (pixel at row 1 and column 1 off, all others on) a signal $$G_1(t) = \frac{C}{\sqrt{4}}(F_1(t) - F_2(t) - F_3(t) - F_4(t))$$

is necessary for column 1, and a signal $$G_2(t) = \frac{C}{\sqrt{4}}(-F_1(t) - F_2(t) - F_3(t) - F_4(t))$$

is necessary for column 2.

As already mentioned, it is necessary for unambiguously obtaining grey values that the pixels are erased, as it were, prior to the selection by bringing them to, for example, the homeotropic state. To this end, the pixels receive an erase or reset signal 35, if desired, which signal is shown only for row 1 in FIG. 5. To prevent a DC voltage across the pixels, the selection signals and the reset signal are preferably presented as DC-free signals, which means that $F_1$ is preferably not used in this example. In an application with selection of groups of 3 rows at a time (p=3), only the selection signals $F_2(t)$, $F_3(t)$, $F_4(t)$ are presented. DC-free means that the voltage integral of the selection voltages in a selection period is substantially zero. By halving signals $F_1 \ldots F_4$ in FIG. 5 as regards their time duration and by presenting them during the first half of the selection period, and by presenting the inverse signal during the second half of the selection period, four DC-free orthogonal row signals are obtained.

In the case of more selection signals, the number of DC-free orthogonal signals may be increased in a generally known manner. The minimum number of orthogonal signals within a selection period $t_{sel}$ is two. The maximum number of orthogonal signals within a selection period $t_{sel}$ is also dependent on the properties of the cell and the desired contrast. As will be shown hereinafter, an optimum value of p can be found for a maximum contrast. For orthogonal signals $F_i(t)$, $F_j(t)$(i, j=1, . . . p) it holds that $$\begin{aligned}\frac{1}{t_{sel}}\int_0^{t_{sel}} F_i(t)F_j(t)dt &= 0 \text{ for } i \neq j \\ &= F^2 \text{ for } i = j\end{aligned}$$

A column signal is composed by means of a mathematical operation of p orthogonal row signals as follows:

$$G(t) = \frac{C}{\sqrt{p}}\{\pm F_1(t) \pm F_2(t) \pm F_3(t) \ldots \pm F_P(t)\} \tag{1}$$

in which a + sign and a − sign indicate whether a pixel must be "off" or "on". For the RMS value $V_{p,eff}$ of a pixel voltage in a selected row, in this example row 1, it holds during the selection period that:

$$V_{p,eff}^2 = \frac{1}{t_{sel}}\int_0^{t_{sel}}\{F_1(t) - G(t)\}^2\,dt = \tag{2}$$

$$= \frac{1}{t_{sel}}\int_0^{t_{sel}}\left(\left[F_1(t) - \frac{C}{\sqrt{p}}\{\pm F_1(t) \pm F_2(t) \pm F_3(t) \ldots \pm F_P(t)\}\right]\right)^2 dt =$$

$$= \frac{1}{t_{sel}}\int_0^{t_{sel}}\left(\left[\left[1 \mp \frac{C}{\sqrt{p}}\right]F_1(t) - \frac{C}{\sqrt{p}}\{\pm F_2(t) \pm F_3(t) \ldots \pm F_P(t)\}\right]\right)^2 dt =$$

$$= \left(\left[1 \mp \frac{C}{\sqrt{p}}\right]\right)^2 F^2 + \frac{C^2}{P}(p-1)F^2 = \left[1 \mp \frac{2C}{\sqrt{p}} + C^2\right]F^2$$

The column voltage is composed of p orthogonal row signals with a normalizing constant C. For row 1 (equation 1) only the sign for $F_1(t)$ in G(t) determined by the data to be displayed influences the RMS voltage of the pixel (equation 2). All other orthogonal signals $\pm F_j(t)(j\neq 1)$ have a constant data-independent contribution.

Since the display device is written once, the p rows written first are most disturbed by the column signals during writing of the other parts of the display device. For the RMS value $V_{rownon\text{-}sel,eff}$ of a non-selected pixel in row 1, it holds in the rest of the frame time that:

$$(V_{rms,eff})^2 = \frac{1}{t_{frame}-t_{sel}}\int_{t_{sel}}^{t_{frame}}[G'(t)]\,dt = \tag{3}$$

$$\frac{1}{t_{frame}-t_{sel}}\int_{t_{sel}}^{t_{frame}}\left(\left[\frac{C}{\sqrt{p}}\{\pm F_1(t)\pm F_2(t)\pm F_3(t)\ \ldots\ \pm F_P(t)\}\right]\right)^2 dt$$

For a display vice with N rows it holds that $t_{frame}=Nt_{sel}$. After the first group of p rows is written, another $$\left(\frac{N}{p}-1\right)$$

groups of rows are written. The first group is then subjected to an interference voltage during $$\left(\frac{N}{p}-1\right)t_{sel}.$$

$$(V_{rms,max})^2 = \frac{1}{t_{sel}}\int_0^{t_{sel}}\frac{C}{\sqrt{p}}\{\pm F_1(t)\pm F_2(t)\pm F_3(t)\ \ldots\ \pm F_P(t)\}^2\,dt$$

This means for the maximum effective value of the interference voltage at the first group of p rows after selection:

$$(V_{rms,max})^2 = \tag{4}$$

$$\frac{1}{\left(\frac{N}{p}-1\right)t_{sel}}\int_{t_{sel}}^{\left(\frac{N}{p}\right)t_{sel}}\left(\left[\frac{C}{\sqrt{p}}\{\pm F_1(t)\pm F_2(t)\pm F_3(t)\pm F_4(t)\}\right]\right)^2 dt$$

or $$V_{rns,max}^{\ rms}=\sqrt{C^2F^2}=CF \tag{5}$$

In the case of (passive) drive of a display device based on the effect described, the effective value of the maximum column voltage should remain below the threshold voltage $V_{pf}$ for the transition from the planar state to the focal-conic state, or $$V_{col,eff}=CF\leqq V_{pf} \tag{6}$$

in order to prevent possible (partial) erasure of previously written information. However, it must also be possible to bring a pixel via the column signals to the planar state (on) or focal-conic state (off). It follows from equations (5) and (2) that $$\left[1+\frac{2C}{\sqrt{p}}+C^2\right]F^2\geq V_{on}^2 \tag{7}$$

-continued $$V_{pf}^2\leq\left[1-\frac{2C}{\sqrt{p}}+C^2\right]F^2\leq V_{off}^2 \tag{8}$$

To determine the maximum number of orthogonal functions p at optimum contrast (and hence the associated acceleration factor with which writing takes place), the equations are rewritten. Since the condition for $V_{pf}$ in equation (8) is not restrictive for the conventional materials, it may be dispensed with. Substitution of (6) in (7) and (8) then yields $$V_{on}^2\leq F^2+\frac{2V_{col,eff}}{\sqrt{p}}F+V_{col,eff}^2\ \text{and} \tag{9}$$

$$V_{off}^2\geq F^2-\frac{2V_{col,eff}}{\sqrt{p}}F+V_{col,eff}^2 \tag{10}$$

This leads to $$V_{on}^2-V_{off}^2\leq\frac{4V_{col,eff}}{\sqrt{p}}F,\ \text{or} \tag{11}$$

$$p\leq\frac{16V_{col,eff}^2}{(V_{on}^2-V_{off}^2)^2}F^2 \tag{12}$$

The optimum value of $F^2$ occurs when the (≦) and (≧) signs are read as equal signs in equations (7) and (8). Addition then yields $$V_{on}^2+V_{off}^2=2(F^2+V_{col,eff}^2)\ \text{or}\ F^2=\tfrac{1}{2}(V_{on}^2+V_{off}^2)-V_{col,eff}^2 \tag{13}$$

Filling in equation (13) in equation (12), while using the equal sign in (6), then results in an expression for the optimum value allowed for p, namely $$p_{opt}=16.V_{pf}^2\left\{\frac{1/2(V_{on}^2+V_{off}^2)-V_{pf}^2}{(V_{on}^2-V_{off}^2)^2}\right\} \tag{14}$$

Filling in equation (13) in equation (6), while using the equal sign in (6), results in an expression for the normalizing constant C, namely $$C=\sqrt{\frac{V_{pf}^2}{\frac{1}{2}(V_{on}^2+V_{off}^2)-V_{pf}^2}} \tag{15}$$

The optimum value p indicates that value giving a maximum contrast while p rows are simultaneously driven with orthogonal signals within a selection period $t_{sel}$. A smaller number may of course also be sufficient when the application allows this; this requires less drive electronics. Driving a larger number of rows than $p_{opt}$ (for example, 1.5 to 2 times as many) with orthogonal signals is also possible, be it that this will be at the expense of the contrast. A considerable acceleration of the writing operation is already reached at $p>\tfrac{1}{2}P_{opt}$.

Example 1: A selection period of 50 msec was chosen for a bistable cholesteric nematic LCD. The associated values for the various voltages in the curve of FIG. 2 were $V_{off}$=25 V, $V_{on}$=29 V, while the contrast was 6.4. Furthermore it held that $V_{pf}$=6 V, which results in $p_{opt}$=8.6, F=26.4 V and C=0.23. The bistable cholesteric nematic LCD can thus be written at a faster rate, as it were, with an acceleration factor of approximately 9 (8 for optimum contrast). At a duration of 50 msec of the selection pulse, 90 (80) rows instead of 10 can now be written within a frame time of 500 msec.

Example 2: A selection period of 10 msec was chosen for the same bistable cholesteric nematic LCD. This is at the expense of the contrast because the voltage reflection curve changes with shorter selection periods and does not reach the reflection value 0 in FIG. 2 (curve b in FIG. 2). The associated values for the various voltages in the curve of FIG. 2 are now $V_{off}$=28 V, $V_{on}$=32 V, while the contrast is only 3.0. Furthermore it holds that $V_{pf}$=7 V, which results in $p_{opt}$=11.6, F=29.3 V and C=0.24. The bistable cholesteric nematic LCD can thus be written at a faster rate, as it were, with an acceleration factor of approximately 12. At a duration of 10 msec of the selection pulse, 60 rows instead of 5 can now be written within a frame period of, for example 50 msec.

The invention is of course not limited to the example shown, but several variations are possible. For example, it is not necessary to make use of the reflective properties of cholesteric nematic liquid crystal material. With a suitable choice of thickness and material, there will be a rotation of polarization in cholesteric nematic liquid crystal material. Transmissive or reflective display devices can then be realized by means of polarizers and a suitable detection means. The orthogonal signals can be generated in different ways.

As stated in the opening paragraph, it is possible to reach addressing times which are necessary for different states by means of especial drive modes, using a preparation phase and an evolution phase, with the actual selection period being between these phases. Also the separate use of a preparation phase or an evolution phase is possible. In this case, a display device based on the cholesteric nematic liquid crystal effect, driven in this way, is controlled with orthogonal signals during the selection period.

As has also been mentioned, the invention is applicable to a display device with a layer of electro-optical material which can assume a plurality of states, at least two state of which are stable in the absence of an electric field, while the electro-optical material is driven by an RMS signal during addressing, and the reflection (transmission)/voltage characteristic curves for both states show a threshold; the further characteristic curves don not need to have a variation which is identical to that of the curve shown, for example, in FIG. 2, for chiralnematic material, but should coincide at least 2 points.

The invention resides in each and every novel characteristic feature and each and every combination of characteristic features.

What is claimed is:

1. A display device comprising a first substrate provided with row electrodes and a second substrate provided with column electrodes, in which overlapping parts of row and column electrodes with an interpositioned layer of electro-optical material define pixels of a light-modulating cell, said electro-optical layer being capable of assuming a plurality of states, at least two states of which are stable in the absence of an electric field, in said at least two states said electro-optical material having a pitch P, further comprising drive means for driving the row electrodes with selection signals and for driving the column electrodes with data signals in conformity with an image to be displayed, characterized in that:

said first and second substrates are spaced such that said light-modulating cell has a thickness at least two times the pitch P, and, in the operating state, the drive means sequentially provide groups of p row electrodes (p>1) with mutually orthogonal signals during a selection period.

2. A display device as claimed in claim 1, characterized in that the electro-optical layer comprises a chiral-nematic liquid crystal material, of which at least a focal-conic state and a planar state are stable in the absence of an electric field.

3. A display device as claimed in claim 2, characterized in that the drive means comprise means for providing the pixels to be selected with preparation signals, prior to selection.

4. A display device as claimed in claim 2, characterized in that the drive means comprise means for providing pixels with evolution signals, after selection.

5. A display device as claimed in claim 1, characterized in that the drive means comprise means for bringing, prior to a selection period, the liquid crystal material in groups of p rows of pixels to a defined state.

6. A display device as claimed in claim 5, characterized in that, in the operating state, the drive means bring the liquid crystal material in groups of p rows of pixels to a homeotropic state, prior to a selection period.

7. A display device as claimed in claim 1, characterized in that the voltage integral of the selection voltages in a selection period is substantially zero.

8. A display device as claimed in claim 1, characterized in that the groups of row electrodes are sequentially provided with mutually orthogonal signals, based on Walsh functions.

9. A display device as claimed in claim 1, characterized in that said first and second substrates are spaced such that said light-modulating cell has a thickness approximately six times the pitch P.

10. A display device comprising a first substrate provided with row electrodes and a second substrate provided with column electrodes, in which overlapping parts of row and column electrodes with an interpositioned layer of electro-optical material define pixels, said electro-optical layer being capable of assuming a plurality of states, at least two states of which are stable in the absence of an electric field, further comprising drive means for driving the row electrodes with selection signals and for driving the column electrodes with data signals in conformity with an image to be displayed, characterized in that the electro-optical layer comprises chiral-nematic liquid crystal material, of which at least a focal-conic state and a planar state are stable in the absence of an electric field, and in the operating state, the drive means sequentially provide groups of p row electrodes (p>1) with mutually orthogonal signals during a selection period, the drive means bring the liquid crystal material in groups of p rows of pixels to a homeotropic state, prior to a selection period, and the value p satisfies the inequality $$p<2\cdot p_{opt},$$

wherein $p_{opt}=16\cdot V_{pf}^2(\frac{1}{2}(V_{on}^2+V_{off}^2)-V_{pf}^2)/(V_{on}^2-V_{off}^2)^2$, and wherein $V_{on}$ is the voltage across a pixel in the reflection (transmission)/voltage characteristic curve, required for the transition to the planar state via the homeotropic state, $V_{off}$ is the voltage across a pixel in the reflection (transmission)/voltage characteristic curve for the transition to the focal-conic state, and $V_{pf}$ is the voltage across a pixel in the reflection (transmission)/voltage characteristic curve for the transition from the planar state to the focal-conic state.

11. A display device as claimed in claim 10, characterized in that the voltage integral of the selection voltages in a selection period is substantially zero.

12. A display device as claimed in claim 10, characterized in that the groups of row electrodes are sequentially provided with mutually orthogonal signals, based on Walsh functions.

13. A display device as claimed in claim 10, characterized in that the electro-optical layer comprises chiral-nematic liquid crystal material, of which at least a focal-conic state and a planar state are stable in the absence of an electric field.

14. A display device as claimed in claim 13, characterized in that the drive means comprise means for providing the pixels to be selected with preparation signals, prior to selection.

15. A display device as claimed in claim 13, characterized in that the drive means comprise means for providing the pixels to be selected with evolution signals, after selection.

* * * * *